H. WHITAKER.
CAMERA ATTACHMENT.
APPLICATION FILED DEC. 1, 1914.
1,148,346.
Patented July 27, 1915.
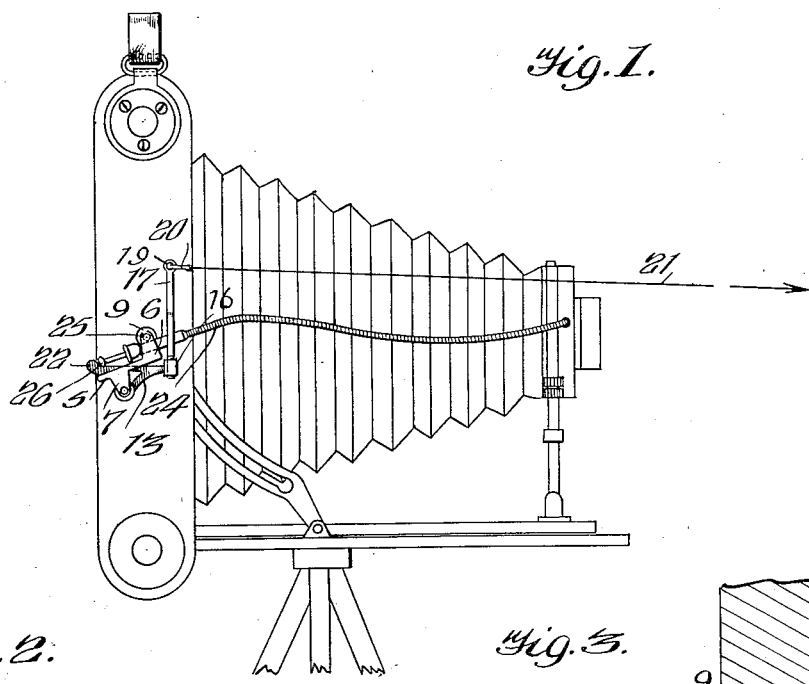
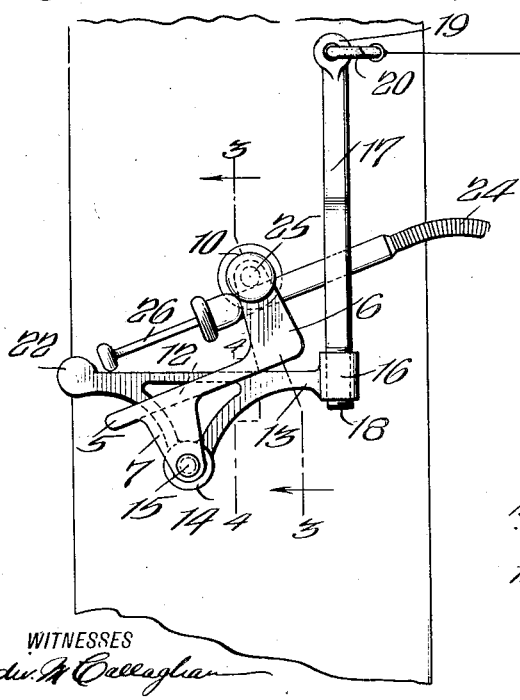
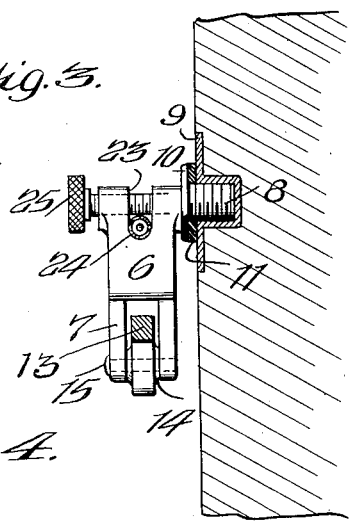
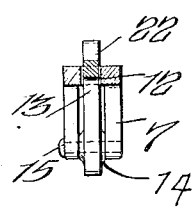
WITNESSES
INVENTOR
HERBERT WHITAKER,
BY Munn & Co.
ATTORNEYS

UNITED STATES PATENT OFFICE.

HERBERT WHITAKER, OF LAWRENCE, MASSACHUSETTS.

CAMERA ATTACHMENT.

1,148,346.  Specification of Letters Patent.  Patented July 27, 1915.

Application filed December 1, 1914. Serial No. 874,989.

*To all whom it may concern:*

Be it known that I, HERBERT WHITAKER, a citizen of the United States, residing at Lawrence, in the county of Essex and State of Massachusetts, have invented certain new and useful Improvements in Camera Attachments, of which the following is a specification.

This invention relates to camera attachments, and more particularly to an improvement in cable release operating mechanisms.

One of the principal objects of my invention is to provide an attachment adapted to be connected to a camera at either of its tripod sockets and embodying mechanism operable at a distance by means of which the cable release may be actuated, so that the photographer may himself appear in the picture.

Another object of the invention is to provide an attachment of the class described including a lever mechanism attachable to a camera and adapted to be operated by a string or thread for actuating the cable release plunger.

A further object of the invention is to provide a device of the class described which will be extremely simple, durable, efficient in operation and inexpensive to manufacture.

With these and other objects in view which will become apparent as the description proceeds, the invention resides in the construction, combination and arrangement of parts, hereinafter more fully described and claimed, and illustrated in the accompanying drawing, in which like characters of reference indicate like parts throughout the several figures, of which—

Figure 1 represents a side elevation view of an attachment constructed according to my invention, showing the same in operable position on a camera. Fig. 2 represents a detail side elevation view of the device in place on the camera. Fig. 3 represents a vertical transverse sectional view taken on the plane indicated by the line 3—3 of Fig. 2, and Fig. 4 represents a vertical transverse sectional view taken on the plane indicated by the line 4—4 of Fig. 2.

In carrying out my invention I provide a bracket consisting of a plate 5 provided at one end with an upwardly projecting lug 6 and at its opposite end with an oppositely projecting pair of ears 7. Lug 6 has a laterally projecting threaded stud or pin 8 adapted to be turned into one of the tripod sockets 9 of a camera. The bracket may be attached to either of the tripod sockets depending upon whether a vertical or horizontal picture is to be taken. Surrounding the stud 8 adjacent lug 6 is a collar 10, and a felt or suitable washer 11 is placed upon stud 8 so that the bracket may be turned into tightened position against the camera. Plate 5 is provided with a central longitudinally extending slot 12 in which a lever 13 is adapted to oscillate. The lever is substantially triangular in shape and is provided at one apex 14 with an eye adapted to receive a pin 15 which projects through the depending ears 7 whereby said lever is pivotally connected to the bracket. At its forward end the lever carries a threaded socket 16, for the reception of an arm 17. The latter is threaded at its lower end at 18 for engagement with sleeve 16 and at its upper end is provided with an eye 19 for the reception of a split ring 20. To the latter is connected a thread or cord 21, which may be held by the operator in actuating the lever at a distance. The outer end of arm 17 is off-set from the lower end thereof, so as not to interfere with or engage with the cable release of the camera. The opposite or rear end of lever 13 is provided with a rounded lug 22.

The upper portion of lug 6 is recessed or grooved as at 23 longitudinally of the bracket, and in this groove is adapted to be disposed the outer end of the cable release 24. It is maintained in place by means of a thumb screw 25 adapted to be turned into threaded openings in lug 6, so as to bridge the cable release 24 and maintain the latter in the lug.

The proportions of the various parts of the device are such, that when the cable release is secured in place, its plunger 26 is disposed adjacent lug 22, and in such position relatively thereto, that upon pulling thread 21 said lug will be brought into engagement with plunger 26 for operating the cable release, thus actuating the shutters of the camera. It has been found that thread 21 may be very small, and when held by the photographer who himself may be in the group of persons whose picture is to be taken, will not appear in the finished photograph.

The bracket may readily be attached to the camera at either of the tripod sockets, so as to operate either when the camera is to take a horizontal or a vertical picture.

The split ring may be permanently attached to thread 21, so that the thread may be connected to the lever mechanism simply by attaching the split ring to eye 19.

Although I have described the preferred embodiment of my invention, I may desire to make such changes in the construction, combination and arrangement of parts thereof as do not depart from the spirit of the invention and the scope of the appended claims.

I claim:—

1. A camera attachment comprising a bracket provided with a lug and with a pair of spaced ears, a threaded stud carried by the lug and adapted to be turned into one of the tripod sockets of a camera for securing said bracket to the camera, said bracket being provided with a longitudinally extending slot, a lever disposed in said slot and adapted to oscillate therein, said lever being pivoted between said ears, and being provided at one end with a rounded lug and at the opposite end with a threaded sleeve, an arm detachably connected to said sleeve, and provided at its free end with an eye, a split ring adapted to be connected to said eye and having a thread attached thereto, first said lug being provided with a groove adapted to receive the cable release of the camera, whereby to position the plunger thereof in the path of said rounded lug, and a thumb screw adapted to be turned into threaded openings in first said lug for bridging the cable release to maintain the same in place.

2. A device of the class described comprising a bracket provided with a grooved lug, means for detachably connecting the bracket with a camera, said bracket provided with a longitudinal slot therein, a lever pivotally connected to said bracket within the slot and adapted to oscillate therein, said lever being provided at one end with a rounded lug, an arm, means for detachably connecting the arm to the opposite end of the lever, a thread, means for detachably connecting the thread to the arm, said grooved lug adapted to receive the cable release of the camera, and means for detachably securing said cable release in place whereby to position the plunger of the release in the path of said rounded lug.

3. A device of the class described comprising a lever, a bracket having means whereby the bracket may be detachably connected to a camera, a lever pivotally connected to the bracket and provided with a lug at one end, means whereby said lever may be oscillated from a distance, and means whereby the cable release of the camera may be detachably secured in position on the bracket whereby the plunger of the cable release will be in the path of said lug.

4. A device of the class described comprising a lever, means whereby said lever may be detachably connected to a camera, means whereby said lever may be oscillated from a distance, a lug carried by the lever, and means whereby the cable release of the camera may be detachably connected to said lever to position the plunger of the release in the path of said lug.

5. A device of the class described comprising a lever, means for detachably connecting the lever to a camera, means whereby the lever may be actuated from a distance, and means for detachably positioning the cable release of the camera relatively to the lever and in the path of movement thereof.

6. The combination with a camera having a cable release, of a lever, means for detachably connecting the lever to the camera, means for operating the lever at a distance, and means for detachably maintaining the cable release in the path of movement of the lever.

7. The combination with a camera having a cable release, of a manually operable lever adapted to be actuated from a distance and adapted to actuate the release cable, and means whereby the lever may be detachably connected with either of the tripod sockets of the camera.

HERBERT WHITAKER.

Witnesses:
JASON P. PHELPS,
WILFRID BARLOW.